United States Patent [19]

Hasegawa

[11] Patent Number: 4,761,550

[45] Date of Patent: Aug. 2, 1988

[54] SCANNING SYSTEM FOR OPTICAL COORDINATE INPUT DEVICE WITH SCAN INTERRUPT CONTROL

[75] Inventor: Kazuo Hasegawa, Furukawa, Japan

[73] Assignee: Alps Electric Co., Ltd., Japan

[21] Appl. No.: 929,336

[22] Filed: Nov. 10, 1986

[30] Foreign Application Priority Data

Nov. 9, 1985 [JP] Japan .................................. 60-251178

[51] Int. Cl.⁴ .............................................. G06F 3/033
[52] U.S. Cl. .................................. 250/221; 340/365 P; 250/222.1
[58] Field of Search ...................... 250/221, 222.1, 578, 250/205; 340/365 P, 711, 712; 178/18

[56] References Cited

U.S. PATENT DOCUMENTS

| | | | |
|---|---|---|---|
| 3,764,813 | 10/1973 | Clement et al. | 250/227 |
| 3,860,754 | 1/1975 | Johnson et al. | 178/18 |
| 4,029,957 | 6/1977 | Betz et al. | 250/221 |
| 4,247,767 | 1/1981 | O'Brian et al. | 250/221 |

Primary Examiner—David C. Nelms
Assistant Examiner—Charles F. Wieland
Attorney, Agent, or Firm—Guy W. Shoup; Leighton K. Chong

[57] ABSTRACT

A scanning system for an optical type coordinate input device comprises a plurality of light emitting elements and photoreceiving elements opposed to each other and a coordinate detection section for successively scanning a plurality of light emitting elements, wherein the light emitting elements in coordinate detection section are scanned while disposing a predetermined scanning interruption period. Since the temperature rise in the casing containing light emitting elements and like other elements can be reduced, erroneous operation of the device can be avoided, and element life can be increased.

3 Claims, 2 Drawing Sheets

1

SCANNING SYSTEM FOR OPTICAL COORDINATE INPUT DEVICE WITH SCAN INTERRUPT CONTROL

BACKGROUND OF THE INVENTION

1. Field of the Invention

This invention concerns a scanning system for an optical type coordinate input device having a plurality of light emitting elements and photoreceiving elements.

2. Description of the Prior Art

An optical type coordinate input device is disposed at the front of an image display element such as a CRT display or LCD for use in the input of coordinates to a computer. The input device comprises a plurality of light emitting elements and photoreceiving elements disposed opposing to the outer circumference of a CRT display screen or the like and has such a constitution for detecting that light is interrupted by fingers or the likes to thereby obtain coordinate signals during scanning for the light emitting elements.

FIG. 3 is a block diagram showing the structure of the entire circuit of an optical type coordinate input device.

In FIG. 3, when an operation start signal Sc from a not illustrated host computer is inputted, a counter circuit 1 starts the counting operation. Then, the counter circuit 1 issues a pulse signal P to a coordinate detection section 2 and a comparator section 4 on every counting, as well as outputs count data Dc to a memory section 5.

The coordinate detection section 2 comprises, for example, 50 light emitting elements and photoreceiving elements for the detection of X coordinate, as well as 35 light emitting elements and photoreceiving elements for the detection of Y coordinate opposing to each other respectively. Then, on every input of the pulse signal P from the counter circuit 1, since respective light emitting elements are successively scanned by decoders and emit light, it is received by each of the corresponding photoreceiving elements as detection signals X, Y and these detection signals X, Y are outputted.

The detection signals X correspond to pulse signals $X_0$–$X_{49}$, while the coordinate signal Y corresponds to pulse signals $Y_{50}$–$Y_{84}$, for example, as shown in FIG. 4.

These detection signals X, Y are inputted into an amplifier section 3, where they are removed with noise components, waveform-shaped and then amplified to a predetermined voltage level, and then inputted to a comparator section 4.

The comparator section 4 judges whether the detection signals X, Y and the pulse signal P from the counter circuit 1 are synchronously inputted or not. Then, if either of the detection signals X, Y is not inputted at the instance where the pulse signal is inputted from the counter circuit 1, the comparator section 4 outputs a memory signal Sm. That is, if the light from the light emitting element corresponding to the addresses "1" and "51" by a finger or the like and the detection signal $X_1$ and the detection signal $Y_{51}$ (detection signals indicated by the dotted line in FIG. 4) are not obtained, the comparator section 4 outputs the memory signals Sm respectively.

When the memory signals Sm corresponding to the detection signals $X_1$, $Y_{51}$ are inputted, the memory section 5 stores the corresponding count data Dc from the counter circuit 1, that is, the count data Dc indicating "1" and "51". Then, it delivers the count data "1" and "51" to an output control section 6.

When both of these count data "1" and "51" are inputted, the output control section 6 judges that the two count data are suitable as the coordinate signals and then output the two count data as the coordinate signals to the host computer. Accordingly, the host computer judges that the coordinate has been inputted and displays the coordinate on the screen of a CRT display or the like. Then, the host computer continuously outputs the operation start signal Sc to the counter circuit 1 to continuously scan the light emitting elements.

By the way, the counter 1 has been continuously operated so far to thereby continuously scan and emit the light emitting elements in the coordinate detection section 2.

While on the other hand, in the optical type coordinate input device, a plurality of light emitting elements and photoreceiving elements etc are tightly closed within a small casing in order to improve the accuracy for the coordinate detection and the selection operationability, as well as for reducing the size. Accordingly, in the case of continuously scanning and lighting the plurality of light emitting elements as described above, since the temperature within the casing is increased, the operations of the light emitting elements, photoreceiving elements and various kinds of electronic parts become instable due to heating to possibly cause misoperation of the coordinate input device.

Although the temperature rise within the casing is prevented, for example, by perforating vent holes to the casing, dusts or the likes intrude into the casing in this case and they are deposited to light emitting elements, photoreceiving elements or the likes, whereby the coordinate input device also causes misoperation and, depending on the case, coordinate detection itself becomes impossible.

SUMMARY OF THE INVENTION

Accordingly, it is an object of this invention to provide a scanning system for an optical type coordinate input device capable of effectively preventing the temperature rise even if light emitting elements or the likes are tightly closed within a small casing, as well as capable of improving the working life of the light emitting elements.

The foregoing object of this invention can be attained by a scanning system for an optical type coordinate input device comprising a plurality of light emitting element and photoreceiving elements opposed to each other and a coordinate detection section for successively scanning a plurality of light emitting elements, wherein the light emitting elements in the coordinate detection section are scanned while disposing a predetermined scanning interruption period.

BRIEF DESCRIPTION OF THE ACCOMPANYING DRAWINGS

These and other objects, as well as features of this invention will now be described more specifically by way of preferred embodiments thereof while referring to the accompanying drawings, wherein FIG. 1 is a block diagram for the optical type coordinate input device according to this invention;

DESCRIPTION OF THE PREFERRED EMBODIMENTS

Figure 1:
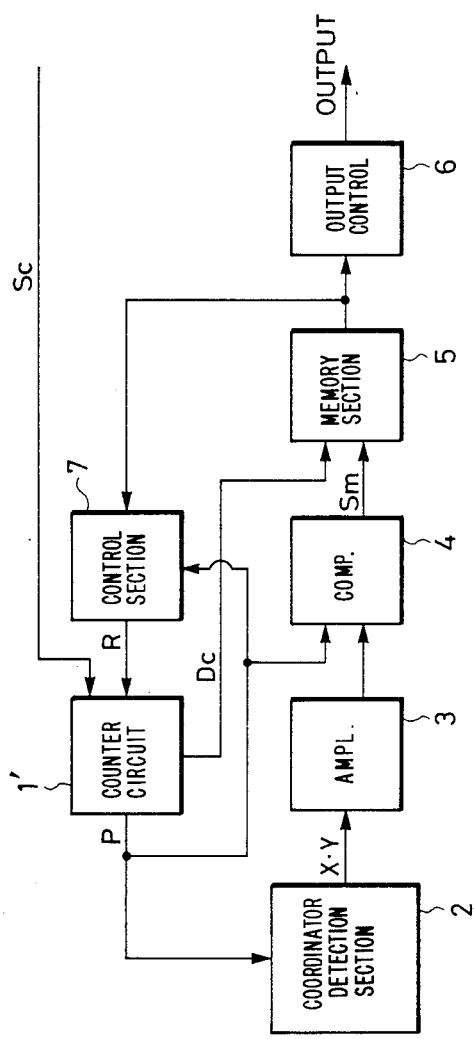

This invention will now be described by way of preferred embodiments referring to the accompanying drawings, in which the portions corresponding to those in the conventional embodiment carry the corresponding reference numerals are not described specifically.

FIG. 1 is a block diagram showing the constitution of the entire circuit for an optical type coordinate input device according to this invention. The optical type coordinate input device comprises a counter circuit 1' that starts the counting operation upon input of an operation start signal Sc from a host computer. The pulse signal P from the counter circuit 1' is outputted to a coordinate detection section 2 and a comparator section 4. The coordinate detection section 2 comprises 50 light emitting elements and photoreceiving elements for the detection of X-coordinate, as well as 35 light emitting elements and photoreceiving elements for the detection of Y-coordinate. Each of the light emitting elements for use in the X-coordinate detection are scanned by an X-coordinate decoder provided within the coordinate detection section 2, while each of the light emitting elements for use in the Y-coordinate detection is scanned by a Y-coordinate decoder provided in the coordinate detection section 2. The comparator section 4 judges whether the detection signals X, Y inputted from the coordinate detection section 2 by way of an amplifier section 3 is synchronous or not with the pulse signal P from the counter circuit 1'. If no detection signal is inputted, it outputs memory signals Sm. The memory section 5 receives and stores the count data Dc from the counter circuit 1 upon input of the memory signal Sm and outputs them to the output control section 6. The output control section 6 outputs the received count data Dc to the host computer as the coordinate signals.

The foregoings concern an identical constitution with that of the conventional optical type coordinate input device.

Now, the control section 7 compares, on every output of the pulse signal P from the counter circuit 1, the pulse signal P with the output from the memory section 5. Then, if the data are not outputted from the memory section 5 in one scanning, the control section 7 outputs a reset signal R for interrupting the operation of the counter circuit 1' for a predetermined time T. On the contrary, the control circuit 7 interrupts the output of the reset signal R in the case if one or more data are outputted from the memory section 5 during scanning. Accordingly, the counter circuit 1' outputs a pulse signal P for continuing the next scanning.

The scanning system according to this invention will now be explained in conjunction with the operation of the optical type coordinate input device.

Figure 2:
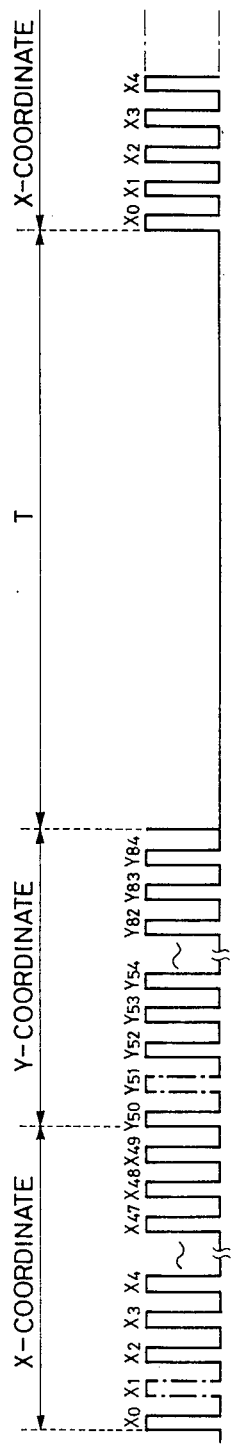
FIG. 2 is a waveform chart of the device.
Figure 3:
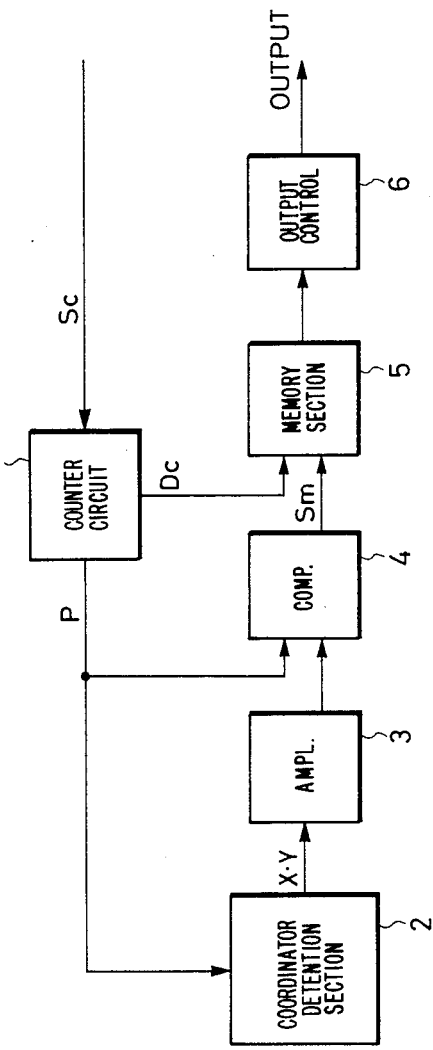
FIG. 3 is a block diagram for the conventional optical type coordinate input device.
Figure 4:
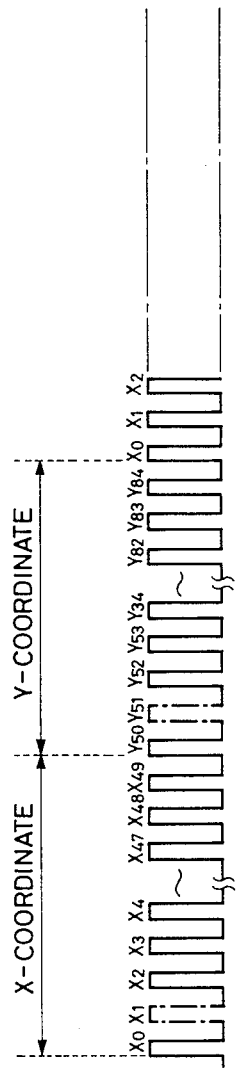
FIG. 4 is a waveform chart for the operation of the device shown in FIG. 3.

When the operation start signal Sc is outputted from the host computer and the counter circuit 1' starts the counting operation, a pulse signal P is outputted from the counter circuit 1'. In the coordinate detection section 2, the X-coordinate decoder and the Y-coordinate decoder conduct scanning on every input of the pulse signals P to emit the respective light emitting elements successively. Accordingly, the photoreceiving elements correponding respectively to the light emitting elements receive the light emitting signals and output, as shown in FIG. 2, the detection signals $X_0$-$X_{49}$ and $Y_{50}$-$Y_{84}$. These detection signals are inputted to the amplifier section 3, where they are eliminated with the noise components and amplified to a predetermined voltage level, and then supplied to the comparator section 4. The comparator section 4 judges whether the detection signals $X_0$-$X_{49}$ and $Y_{50}$-$Y_{84}$ are inputted or not on every input of the pulse signals P. Then, in the case if $X_1$ and $Y_{51}$ are not inputted as shown in FIG. 2, the memory signals Sm are outputted respectively to the memory section 5 synchronized with the non-input period. When the memory signals Sm are inputted, the memory section 5 receives to store the corresponding count data Dc, that is, the count data "1" corresponding to the detection signal $X_1$ and the count data "51" corresponding to the detection signal $Y_{51}$ in this case from the counter circuit 1'. Then, since the memory section 5 delivers two count data "1" and "51" to the output control section 6, the output control section 6 supplies the count data "1" and "51" as the coordinate signals or the coordinate signals based on these count data to the host computer. Accordingly, the host computer judges that the coordinate input has been made and displays the coordinates on the screen of a CRT display or the like.

By the way, the count data "1" and "51" outputted from the memory section 5 are also inputted to the control section 7. The control section 7 outputs the reset signal R to the counter circuit 1' only for a predetermined time upon data input. Accordingly, even if the operation start signal Sc is outputted from the host computer to the counter circuit 1' after the completion for the first scanning, the counter circuit 1' does not conduct the counting operation continuously but maintain the interrupted state. Accordingly, since the scanning operation of the coordinate detection section 2 is also interrupted, the light emitting elements do not emit light and a scanning interruption period T is resutled as shown in FIG. 2. The interruption period T is about from 0.2 to 0.5 sec and has no effects on the coordinate input at all.

Since the number of light emission per unit time of the light emitting elements is decreased by interrupting the scanning after the input of the coordinate to provide the interruption time T, the temperature in the casing containing light emitting elements, photoreceiving elements and other electronic parts tightly closed therein does not rise so much, whereby erroneous operation of the optical time coordinate input device can be prevented and power consumption can be reduced to provide an economical advantage.

The foregoing embodiment may be modified such that the operation start signal Sc from the host computer is supplied by way of the control section 7 to the counter circuit 1' and the supply of the operation start signal Sc is periodically stopped by the control section 7. In this case, since the interruption period T is produced at a certain constant period, this can provide more reliable prevention for the temperature rise within the casing the a greater economical advantage.

Further, scanning including the interruption period T for the light emitting elements can also be attained by interrupting the supply of the pulse signal P from the counter circuit 1' to the coordinate detection section 2.

According to this invention, since the light emitting elements in the coordinate detection section are scanned while disposing a predetermined interruption period, the number of light emission per unit time of the light emitting elements can be decreased within a possible range. Accordingly, since the temperature rise in the casing in which light emitting elements, photoreceiving elements, etc are tightly closed can be retained, erroneous operation of the optical type coordinate input device can effectively be prevented, as well as the working life of the light emitting elements is increased and the electric power consumption can be reduced to provide an economical advantage.

What is claimed is:

1. A scanning system for an optical coordinate input device of the type having two mutually perpendicular coordinate detection sets forming a detection matrix, each set having a row of light emitting elements facing opposite a row of light receiving elements for detecting a coordinate input by blockage of a light beam between a light emitting element and a corresponding light receiving element, said scanning system comprising:

scanning means for scanning in sequence the opposed rows of light emitting and receiving elements of the coordinate detection sets by causing each light emitting element to emit a light beam and detecting whether or not the light beam is received by the corresponding light receiving element;

output means connected to said scanning means for sensing when a light beam between a light emitting element and the corresponding light receiving element is blocked, indicating detection of a coordinate input, and for outputting a coordinate data output based thereon; and control means connected to said scanning means and said output means for interrupting the scanning of said coordinate detection sets for a predetermined interruption period following detection of a coordinate input and output of the coordinate data output by said output means.

2. A scanning system for an optical coordinate input element as defined in claim 1, wherein the scanning interruption period is from 0.1 to 0.5 seconds.

3. A scanning system according to claim 1, wherein said scanning means includes a counter circuit for receiving an input scan command signal and outputting a counted series of pulse signals in response thereto, and a coordinate detection section for performing a scanning operation on the light emitting elements of said coordinate detection sets in sequence with said pulse signals and outputting a corresponding sequence of light reception output signals from the light receiving elements, wherein said output means includes a comparator section for receiving said counted series of pulse signals from said counter circuit and said corresponding output sequence from said coordinate detection section for determining whether non-receipt of a light reception signal in said output sequence indicates a valid coordinate input, a memory section for storing and outputting a coordinate input signal upon determination of a valid coordinate input by said comparator section, and an output control section for providing the coordinate input signal from said memory section as coordinate data output, and wherein said control means includes a control section for sensing when a valid coordinate input signal is output from said memory section and for outputting a reset signal in response thereto to prevent said counter circuit from providing a next sequence of pulse signals for said predetermined interruption period after the providing of a coordinate data output from said output control section.

* * * * *